(12) United States Patent
Gallo et al.

(10) Patent No.: US 12,273,249 B2
(45) Date of Patent: Apr. 8, 2025

(54) SYSTEMS AND METHODS FOR SELECTIVE STORING OF DATA INCLUDED IN A CORRUPTED DATA PACKET

(71) Applicant: SONOVA AG, Staefa (CH)

(72) Inventors: Alessandro Gallo, Murten (CH); Federico Ferrari, Bern (CH)

(73) Assignee: Sonova AG, Staefa (CH)

( * ) Notice: Subject to any disclaimer, the term of this patent is extended or adjusted under 35 U.S.C. 154(b) by 291 days.

(21) Appl. No.: 17/799,215

(22) PCT Filed: Feb. 24, 2020

(86) PCT No.: PCT/IB2020/051565
§ 371 (c)(1),
(2) Date: Aug. 11, 2022

(87) PCT Pub. No.: WO2021/171057
PCT Pub. Date: Sep. 2, 2021

(65) Prior Publication Data
US 2023/0117443 A1    Apr. 20, 2023

(51) Int. Cl.
*H04L 43/0823* (2022.01)
*G10L 19/005* (2013.01)
(Continued)

(52) U.S. Cl.
CPC .......... *H04L 43/0847* (2013.01); *G10L 19/24* (2013.01); *H04L 1/0041* (2013.01);
(Continued)

(58) Field of Classification Search
CPC ... H04L 43/0847; H04L 69/22; H04L 1/0041; H04L 1/0045; H04L 1/0061; G10L 19/24; G10L 19/005; H04R 25/554
See application file for complete search history.

(56) References Cited

U.S. PATENT DOCUMENTS 6,741,554 B2    5/2004  D'Amico et al.
6,944,802 B2 *  9/2005  Park ................. H04L 1/0083
                                               370/242
(Continued)

FOREIGN PATENT DOCUMENTS

CN    106797518 A    5/2017
CN    110650772 A    1/2020
(Continued)

OTHER PUBLICATIONS

"International Search Report and Written Opinion received in International Application No. PCT/IB2020/051560 received Sep. 25, 2020."

(Continued)

*Primary Examiner* — John J Tabone, Jr.
(74) *Attorney, Agent, or Firm* — ALG Intellectual Property, LLC

(57) ABSTRACT

An exemplary hearing device is configured to receive, from a source, a data packet, the data packet including a plurality of frames including a first frame and a second frame. The hearing device determines that the data packet has an invalid checksum. The hearing device accesses, in response to the determining that the data packet has the invalid checksum, a first frame checksum for the first frame and a second frame checksum for the second frame. The hearing device determines that the first frame checksum is invalid and that the second frame checksum is valid. The hearing device discards, based on the first frame checksum being invalid, the first frame and stores, based on the second frame checksum being valid, the second frame.

20 Claims, 9 Drawing Sheets

(51) Int. Cl.
*G10L 19/24* (2013.01)
*H04L 1/00* (2006.01)
*H04L 69/22* (2022.01)
*H04R 25/00* (2006.01)

(52) U.S. Cl.
CPC .......... *H04L 1/0045* (2013.01); *H04L 1/0061* (2013.01); *H04L 69/22* (2013.01); *H04R 25/554* (2013.01); *G10L 19/005* (2013.01)

(56) References Cited

U.S. PATENT DOCUMENTS

| | | | |
|---|---|---|---|
| 10,009,141 | B2 | 6/2018 | Choi |
| 10,178,711 | B2 | 1/2019 | Li et al. |
| 10,200,803 | B1 | 2/2019 | Tong et al. |
| 10,341,758 | B1 | 7/2019 | Tong et al. |
| 10,348,370 | B2 | 7/2019 | Thoen et al. |
| 10,412,567 | B1 | 9/2019 | Tong |
| 2005/0089183 | A1 | 4/2005 | Niederdrank et al. |
| 2006/0280204 | A1 | 12/2006 | Nagata |
| 2008/0065943 | A1* | 3/2008 | Botha .................. H04L 1/1829 714/776 |
| 2009/0034498 | A1 | 2/2009 | Banerjea et al. |
| 2012/0058727 | A1 | 3/2012 | Cook et al. |
| 2015/0319557 | A1 | 11/2015 | El-Hoiydi |
| 2016/0026523 | A1* | 1/2016 | Cohen .................. H03M 13/09 714/807 |
| 2016/0044426 | A1 | 2/2016 | Duchscher et al. |
| 2017/0077952 | A1 | 3/2017 | Hammerschmidt |
| 2017/0332241 | A1* | 11/2017 | Liu ...................... H04J 3/1617 |
| 2018/0084456 | A1 | 3/2018 | Gostev |
| 2018/0317126 | A1 | 11/2018 | Wang |
| 2018/0324146 | A1* | 11/2018 | Meriac .................. H04W 4/80 |
| 2019/0044576 | A1 | 2/2019 | Thoen et al. |
| 2019/0104423 | A1 | 4/2019 | Hariharan |
| 2019/0159285 | A1 | 5/2019 | Li et al. |
| 2019/0207835 | A1 | 7/2019 | Lohiya et al. |
| 2019/0317126 | A1 | 10/2019 | Baralia et al. |
| 2020/0220655 | A1 | 7/2020 | Agarwal et al. |
| 2020/0322092 | A1 | 10/2020 | Goyal et al. |
| 2020/0329052 | A1 | 10/2020 | Goyal et al. |
| 2020/0396028 | A1 | 12/2020 | Haartsen et al. |
| 2021/0015200 | A1 | 1/2021 | Tuli |
| 2023/0117443 | A1* | 4/2023 | Gallo .................. H04R 25/554 714/37 |

FOREIGN PATENT DOCUMENTS

| | | |
|---|---|---|
| EP | 3133760 | 2/2017 |
| EP | 2119200 | 4/2018 |
| WO | 2008113053 | 9/2008 |
| WO | 2018057524 | 3/2018 |
| WO | 2019129748 | 7/2019 |
| WO | 2019178107 | 9/2019 |

OTHER PUBLICATIONS

"International Search Report and Written Opinion received in International Application No. PCT/IB2020/051565 received Nov. 17, 2020."

"International Search Report and Written Opinion received in International Application No. PCT/IB2020/051566 received Nov. 13, 2020."

Afaneh, et al., "Understanding SN and NESN in a BLE Link Layer Packet", Novel Bits, Mohammad Afaneh, Nov. 11, 2016. https://www.novelbits.io/understanding-sn-nesn-ble-link-layer-packet/ [retrieved Sep. 14, 2020].

Nokia, et al., "CRC Attachment FOr eMBB Data", Alcatel-Lucent Shangai Bell; 3GPP Draft; R1-1612279_CRC Attachment, 3rd Generation Partnership Project (3GPP), Mobile Competence Centre; https://www.3gpp.org/.org/ftp/Meetings_3GPP_SYNC/RAN1/Docs/. Reno, U.S.A., Nov. 14-18, 2016.

First Office Action received in Chinese Patent Application No. 202080097475.0, dated Jun. 4, 2024.

* cited by examiner

SYSTEMS AND METHODS FOR SELECTIVE STORING OF DATA INCLUDED IN A CORRUPTED DATA PACKET

BACKGROUND INFORMATION

In some situations, it is desirable for a hearing device to render (e.g., acoustically present) streaming audio from an audio source (e.g., a Bluetooth-enabled smartphone or other device) to a user. To this end, the hearing device may establish a wireless link (e.g., a Bluetooth link) with the audio source and receive audio packets transmitted from the audio source over the wireless link in accordance with an acknowledgement-based transmission protocol. The acknowledgement-based transmission protocol requires the hearing device to acknowledge successful receipt of an audio packet transmitted by the audio source before the audio source transmits a subsequent audio packet. The hearing device may store the audio packets in a buffer as the audio packets are received and render the audio by playing back the audio packets from the buffer. However, audio packets transmitted by the audio source may not always be received correctly by the hearing device.

WO2019178107A1 describes a method according to which a receiver stores corrupted versions of a packet multiple times, then tries and reconstructs a correct payload performing bitwise algorithms across the multiple receptions, using various heuristics.

U.S.10009141B2 describes multiple receivers in a cellular network, receiving redundant packets from the same transmitter, a first receiver receiving a corrupted packet and requesting redundant error correction data from another receiver. The relayed error correction data allows the first receiver to correct the corrupted packet.

U.S. Pat. No. 6,741,554B2 describes a first wireless device that receives a first corrupted packet from a second wireless device over a first communication channel, then it receives a second copy of the packet from the second wireless device over a second communication channel. The two received packets are compared and a choice is made to reconstruct a correct packet.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Exemplary systems and methods for selective storing of data included in a corrupted data packet by hearing devices and systems are described herein. For example, a hearing device may comprise a memory storing instructions and a processor communicatively coupled to the memory and configured to execute the instructions to receive, from a source, a data packet, the data packet including a plurality of frames including a first frame and a second frame. The processor may be further configured to determine that the data packet has an invalid checksum and access, in response to the determining that the data packet has the invalid checksum, a first frame checksum for the first frame and a second frame checksum for the second frame. The processor may be further configured to determine that the first frame checksum is invalid and determine that the second frame checksum is valid. The processor may be further configured to discard, based on the first frame checksum being invalid, the first frame and store, based on the second frame checksum being valid, the second frame.

The systems and methods described herein may advantageously provide many benefits to users of hearing devices. For example, the hearing devices described herein may provide audio to a user with fewer errors and/or delays than conventional hearing devices. The hearing devices may also be usable in environments with less reliable connectivity to audio sources than conventional hearing devices. For at least these reasons, the systems and methods described herein may advantageously increase performance, reliability, and ease of use for hearing device users compared to conventional hearing devices. These and other benefits of the systems and methods described herein will be made apparent herein.

As used herein, the term "audio packet" refers to any sample, portion, or other type of audio data representative of or otherwise associated with streaming audio that is provided by an audio source. An audio packet may be in any suitable format and may be transmitted in any suitable manner. While examples are described herein with reference to audio sources and audio packets, the systems and methods may be used by any suitable type of device with any data packet from any suitable type of data source.

Figure 1:
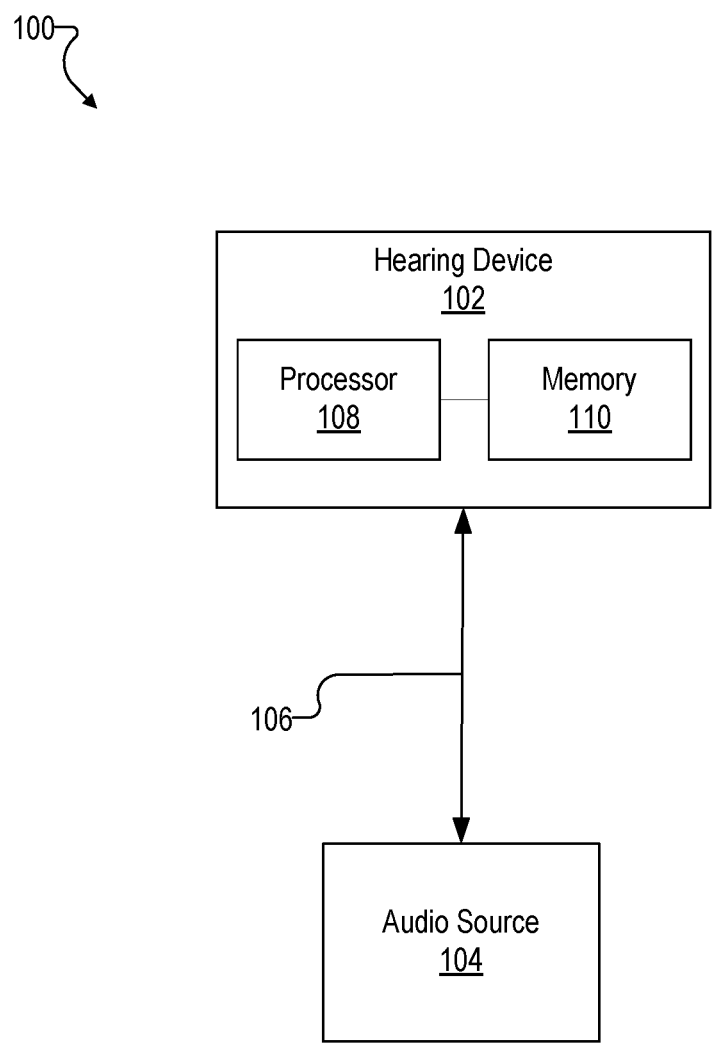
FIG. 1 illustrates an exemplary configuration in which a hearing device is configured to communicate with an audio source according to principles described herein.

FIG. 1 shows an exemplary configuration 100 in which a hearing device 102 is configured to communicate with an audio source 104 by way of a selectively established wireless link 106. Hearing device 102 may be implemented by any type of device configured to provide or enhance hearing to a user. For example, hearing device 102 may be implemented by a hearing aid configured to apply amplified audio content to a user, a sound processor included in a cochlear implant system configured to apply electrical stimulation representative of audio content to a user, a sound processor included in an electro-acoustic stimulation system configured to apply electro-acoustic stimulation to a user, a head-worn headset, an ear-worn ear-bud or any other suitable hearing prosthesis. As shown, hearing device 102 includes a processor 108 communicatively coupled to a memory 110.

Hearing device 102 may include additional or alternative components as may serve a particular implementation.

Audio source 104 may include any computing device that outputs streaming audio (e.g., speech, music, or other audio content output) and that is capable of being wirelessly connected with one of hearing devices 108. For example, audio source 104 may be a mobile device (e.g., a mobile phone such as a smartphone, a tablet computer, a laptop computer, a mobile gaming device), a desktop computer, a television, a speaker, etc. As described herein, audio source 104 may wirelessly transmit streaming audio to hearing system 102 in the form of sequential audio packets (e.g., discrete units or pieces of data representative of the streaming audio).

To facilitate communication between hearing device 102 and audio source 104, hearing device 102 may establish a wireless link with audio source 104. For example, as shown in FIG. 1, hearing device 102 may establish wireless link 106 with audio source 104. Wireless link 106 may include a Bluetooth link (e.g., a Bluetooth classic link or a Bluetooth low energy link), a near field communication link, or any other suitable point-to-point link. To this end, hearing device 102 and audio source 104 may each include a wireless interface configured to operate in accordance with any suitable wireless communication protocol.

Hearing device 102 may receive audio packets transmitted from audio source 104 over wireless link 106 in accordance with an acknowledgement-based transmission protocol (also referred to as an automatic repeat query ("ARQ") protocol). This may allow hearing device 102 to render (e.g., process and play back) streaming audio from audio source 104.

The acknowledgement-based transmission protocol requires hearing device 102 to acknowledge successful receipt of an audio packet transmitted by audio source 104 before audio source 104 transmits a subsequent audio packet. Exemplary acknowledgement-based transmission protocols include stop-and-wait ARQ, go-back-N ARQ, and selective repeat ARQ. A Bluetooth communication protocol, for example, may use any of these acknowledgement-based transmission protocols.

Processor 108 may be configured to perform various processing operations, such as receiving and processing streaming audio transmitted by audio source 104. Processor 108 may be implemented by any suitable combination of hardware and software. In the description that follows, any references to operations performed by hearing device 102 may be understood to be performed by processor 108 of hearing device 102.

Memory 110 may be implemented by any suitable type of storage medium and may maintain (e.g., store) data utilized by processor 108. For example, memory 110 may store data representative of an operation program that specifies how each processor 108 processes and delivers audio content to a user. To illustrate, if hearing device 102 is a hearing aid, memory 110 may maintain data representative of an operation program that specifies an audio amplification scheme (e.g., amplification levels, etc.) used by processor 108 to deliver acoustic content output by audio source 104 to the user. As another example, if hearing device 102 is a sound processor included in a cochlear implant system, memory 110 may maintain data representative of an operation program that specifies a stimulation scheme used by hearing device 102 to direct a cochlear implant to apply electrical stimulation representative of acoustic content output by audio source 104 to the user. As will be described below, memory 110 may maintain a buffer within which audio packets received from audio source 104 may be stored.

Figure 2:
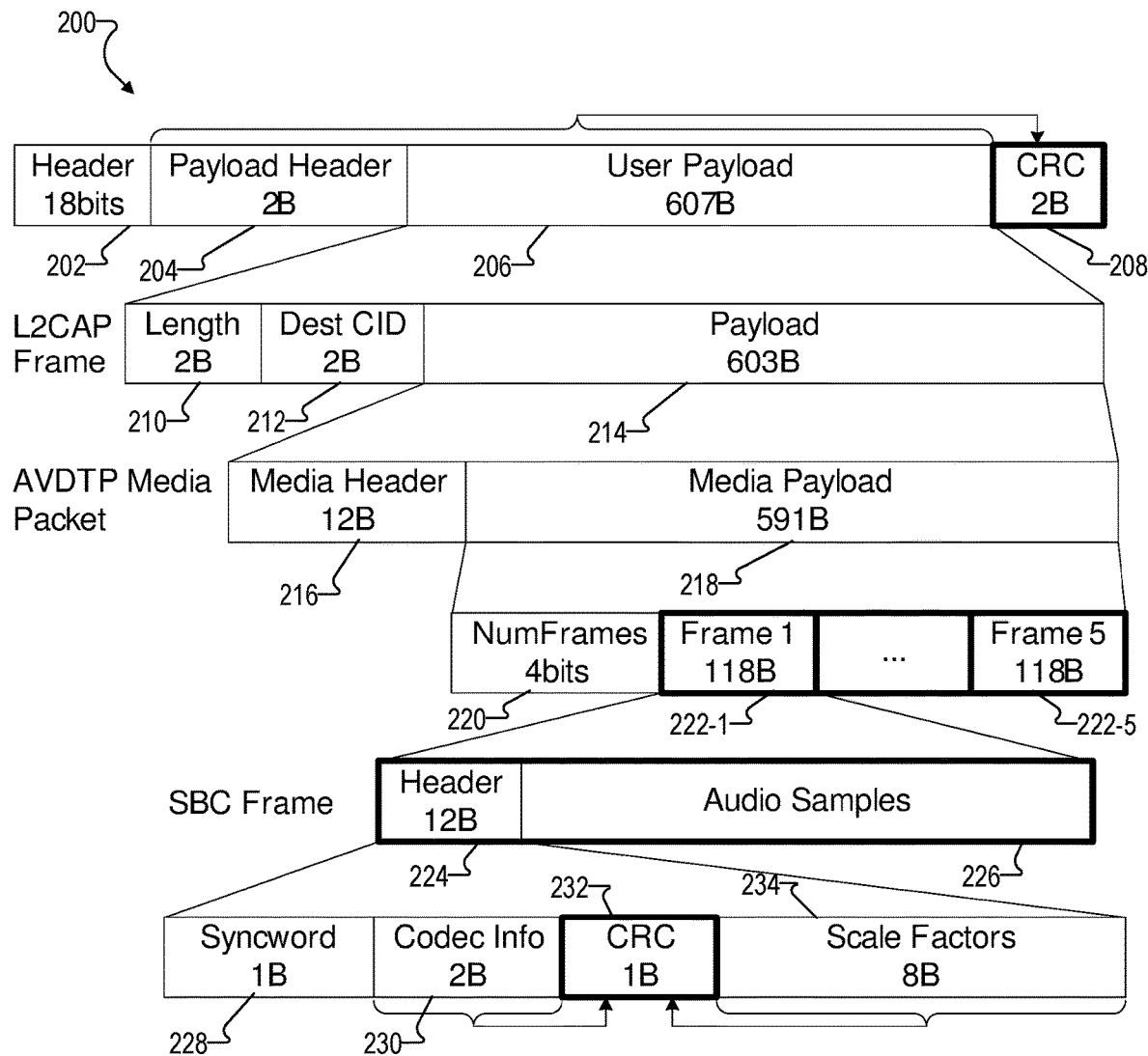
FIG. 2 illustrates an exemplary audio packet according to principles described herein.

FIG. 2 illustrates an example audio packet 200. In this example, audio packet 200 is an audio packet encoded using an advanced audio distribution profile (A2DP). Audio packet 200 includes a header 202, a payload header 204, a user payload 206 and a cyclic redundancy check (CRC) 208. As an example A2DP audio packet, header 202 may be assigned 18 bits, payload header 204 may be 2 bytes, user payload 206 may be 607 bytes, and CRC 208 may be 2 bytes. Header 202 and payload header 204 may include information regarding audio packet 200. User payload 206 may include audio data, along with additional information regarding the audio data. CRC 208 may be a checksum for detecting errors in audio packet 200. Such errors may arise for various reasons, such as errors in transmission of audio packet 200 resulting in corrupted data in either payload header 204 or user payload 206. In some examples, corrupted data in header 202 may also result in an invalid value for CRC 208 (e.g., a CRC value determined based on received data does not match a received CRC value). In contrast, a valid value for CRC 208 (e.g., a CRC value determined based on received data matches a received CRC value) may indicate that audio packet 200 has been transmitted correctly and the data is not corrupted.

User payload 206 may include a data frame encoded in accordance with a logical link control and adaptation protocol (L2CAP). Accordingly, user payload 206 may include a length 210, a destination channel identifier (CID) 212, and a payload 214. Length 210 may be 2 bytes and indicate a length of the L2CAP data frame. Destination CID 212 may be 2 bytes and indicate a destination channel. Payload 214 may be 603 bytes and include a media packet encoded in accordance with an audio/video distribution transport protocol (AVDTP). Accordingly, payload 214 may include a media header 216 and a media payload 218. Media header 216 may be 12 bytes and include information regarding the AVDTP media packet. Media payload 218 may be 591 bytes and include a plurality of audio frames.

For example, media payload 218 may include a count 220 and the plurality of audio frames 222 (e.g., audio frame 222-1 through audio frame 222-5). Count 220 may be 4 bits and indicate a number of audio frames. In this example, count 220 may indicate that there are 5 audio frames 222. Each audio frame 222-1 through audio frame 222-5 may be 118 bytes long.

Each of audio frames 222, such as audio frame 222-1, may include audio data encoded using sub-band coding (SBC). Audio frame 222-1 may include a header 224 and audio samples 226. Header 224 may include information regarding the SBC audio frame, including a syncword 228, codec info 230, a CRC 232, and scale factors 234. CRC 232 may be a checksum for detecting errors in codec info 230 and scale factors 234 (e.g., a value for CRC 232 is determined based on bit values of codec info 230 and scale factors 234).

Typically, a hearing device (e.g. hearing device 102) may receive a data packet (e.g., audio packet 200) from a source (e.g., audio source 104). Upon receiving audio packet 200, hearing device 102 may check a packet-level checksum (e.g., CRC 208) to determine whether audio packet 200 has been transmitted properly. If CRC 208 is valid, hearing device 102 may store audio packet 200 (e.g., in a buffer) for processing and playback as audio. Conversely, an invalid value for CRC 208 may indicate that audio packet 200 has not been transmitted properly, resulting in corrupted data, such as in either payload header 204 or user payload 206. As a result, hearing device 102 may discard audio packet 200 and request and/or wait for a retransmission of audio packet 200. However, retransmission of audio packets uses up a significant amount of resources, such as power, bandwidth, and time. Further, transmission errors may quickly compound. For instance, with 600-byte packets, a bit error rate of 0.015% may result in a 50% packet error rate. Such compounding of errors may result in buffer underflows and/or audio interruptions.

Figure 3:
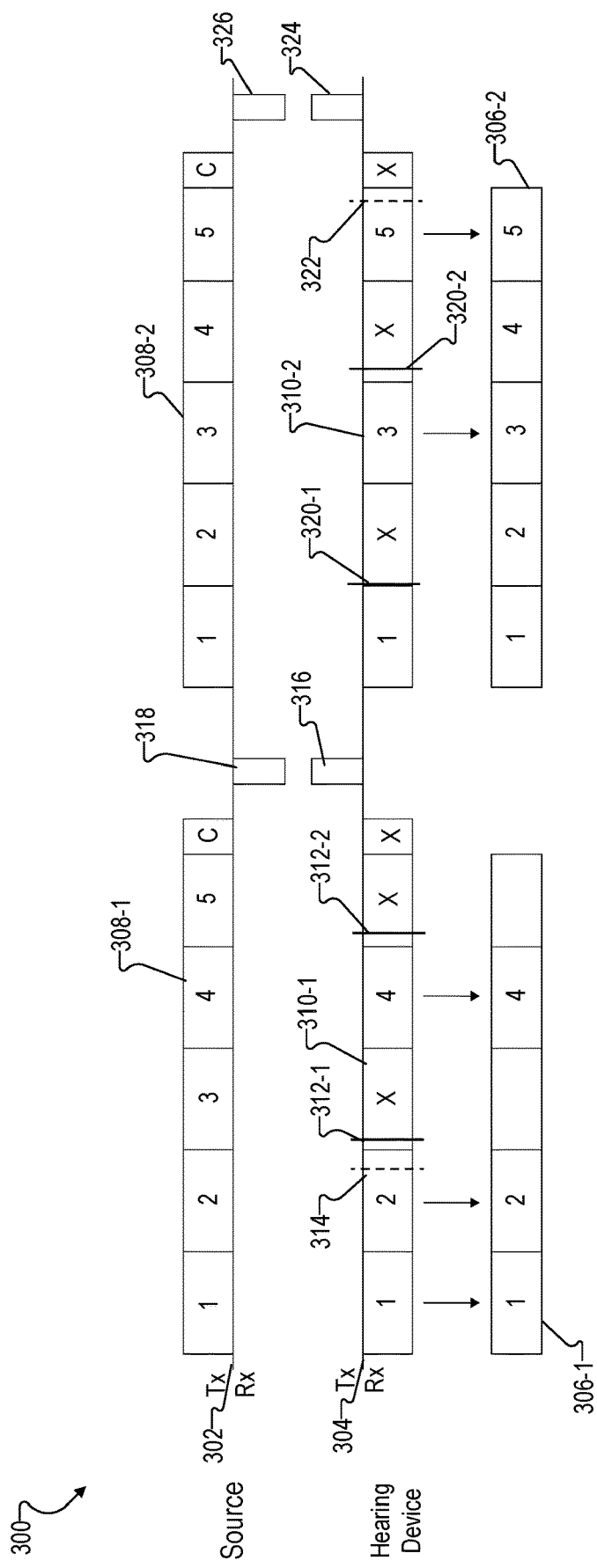
FIG. 3 illustrates an exemplary diagram of selectively storing data included in a corrupted data packet according to principles described herein.

FIG. 3 illustrates an exemplary diagram 300 for selectively storing data included in a corrupted audio packet. Diagram 300 includes a line 302 showing data transmitted and received by an audio source (e.g., audio source 104). A line 304 shows data transmitted and received by a hearing device (e.g., hearing device 102). Blocks 306 (e.g., block 306-1 and block 306-2) show states of a buffer of hearing device 102. In this example, line 302 shows a block 308-1 indicating a transmitting of an audio packet (e.g., an implementation of audio packet 200) including 5 SBC frames (frames with numbers 1 through 5) and a packet-level checksum (frame with letter C). Line 304 includes a block 310-1 indicates that hearing device 102 receives the audio packet. However, the audio packet may be received with corrupted data, which may be determined by an invalid checksum of the received audio packet (e.g., a checksum calculated based on data of the received audio packet does not match a checksum received with the audio packet). Despite the invalid checksum, rather than discard the entire audio packet, hearing device 102 may selectively store some of the data included in the corrupted audio packet.

In response to determining the invalid checksum, hearing device 102 may access checksums of the audio frames, such as SBC frames 1 through 5 (e.g., CRC 232). As described, CRC 232 may be a checksum for detecting errors in codec info 230 and scale factors 234 of an SBC audio frame (e.g., audio frame 222-1). Errors in codec info 230 and/or scale factors 234 may result in significantly noticeable artefacts in playback of such audio frames. In contrast, errors in audio samples 226 may result in less noticeable artefacts in playback. Further, CRC 232 may not detect for errors in audio samples 226 (e.g., CRC 232 may be calculated without consideration of bit values in audio samples 226).

Consequently, hearing device 102 may determine whether the checksums for each of SBC frames 1 through 5 are valid or invalid. In this example, frames 3 and 5 include corrupted bits in SBC headers of the SBC frames (represented by line 312-1 and line 312-2), resulting in invalid frame checksums. Based on the invalid frame checksums, hearing device 102 may discard SBC frames 3 and 5. SBC frame 2 is shown to include a corrupted bit in audio samples, represented by dashed line 314. As described, corrupted data in audio samples may result in artefacts that may be considered acceptable. Further, corrupted data in audio samples may result in a valid frame checksum. Thus, hearing device 102 may store SBC frame 2 based on the valid frame checksum despite including corrupted data. SBC frames 1 and 4 also have valid checksums, as SBC frames 1 and 4 were transmitted properly and have no corrupted data. Therefore, hearing device 102 also stores SBC frames 1 and 4. Buffer 306-1 shows a result of the selectively storing data included in a corrupted audio packet, with SBC frames 1, 2, and 4 stored while SBC frames 3 and 5 are discarded.

A block 316 indicates hearing device 102 transmits an acknowledgment to audio source 104 and a block 318 indicates audio source 104 receives the acknowledgment. In this instance, as hearing device 102 has not successfully received the audio packet, the acknowledgment may include a request for retransmission of the audio packet.

A block 308-2 indicates a response to the retransmission request with audio source 104 retransmitting the audio packet. A block 310-2 indicates hearing device 102 receives the retransmitted audio packet. However, the received retransmitted audio packet also includes an invalid checksum, indicating corrupted data in the received retransmitted audio packet. In this instance, as indicated by a line 320-1 and a line 320-2, corrupted bits may be in SBC headers for SBC frames 2 and 4 of the retransmitted audio packet. A dashed line 322 may indicate a corrupted bit in audio samples for SBC frame 5. Hearing device 102 may determine that the retransmitted audio packet has an invalid packet-level checksum. In response, hearing device 102 may access frame checksums and determine that checksums for SBC frames 2 and 4 are invalid and checksums for SBC frames 1, 3, and 5 are valid. As a result, hearing device 102 may store SBC frames 1, 3, and 5 and discard SBC frames 2 and 4. Alternatively, hearing device 102 may also discard SBC frame 1 as hearing device 102 already stored SBC frame with the initial transmission of the audio packet. In some examples, hearing device 102 may access frame checksums only for frames that were discarded in previous transmissions of a same audio packet. For instance, hearing device 102 may access frame checksums for SBC frames 2 and 4, while not accessing frame checksums for SBC frames 1, 3, and 5 in the retransmitted packet as hearing device 102 already stored SBC frames 1, 3, and 5 in the initial transmission of the audio packet.

As hearing device 102 selectively stores data included in a corrupted audio packet, though both the initial transmission and the retransmission of the audio packet included errors and invalid checksums, hearing device 102 may be able to store a playable instance of the audio packet based on the initial transmission and the retransmission of the audio packet. Thus, hearing device 102 may transmit an acknowledgment message, represented by a block 324, indicating that hearing device 102 has received the audio packet rather than requesting another retransmission of the audio packet. Audio source 104 may receive the acknowledgment message, represented by a block 326, and in response transmit a subsequent audio packet. While diagram 300 shows two transmissions of the audio packet, hearing device 102 may selectively store data from any suitable number of transmissions to store a playable instance of the audio packet.

While diagram 300 shows an example using an audio packet encoded according to A2DP, any suitable audio packet encoding scheme may be used. For example, for an encoded audio packet that does not include checksums for each frame of the audio packet, hearing device 102 may access a checksum for a frame by calculating a checksum. The checksum may be determined to be valid or invalid by comparing the calculated checksum with a checksum calculated on a corresponding frame of a retransmission of the audio packet. In some examples, checksums may be accessed (e.g., read, calculated, etc.) based on a portion of corresponding frames.

In some examples, in addition to or as an alternative to hearing device 102 receiving retransmissions of audio packets from audio source 104, hearing device 102 may receive missed and/or corrupted frames of audio packets from another hearing device. For example, another hearing device may also receive the audio packets from audio source 104 and forward such frames to hearing device 102. Examples are described herein.

Figure 4:
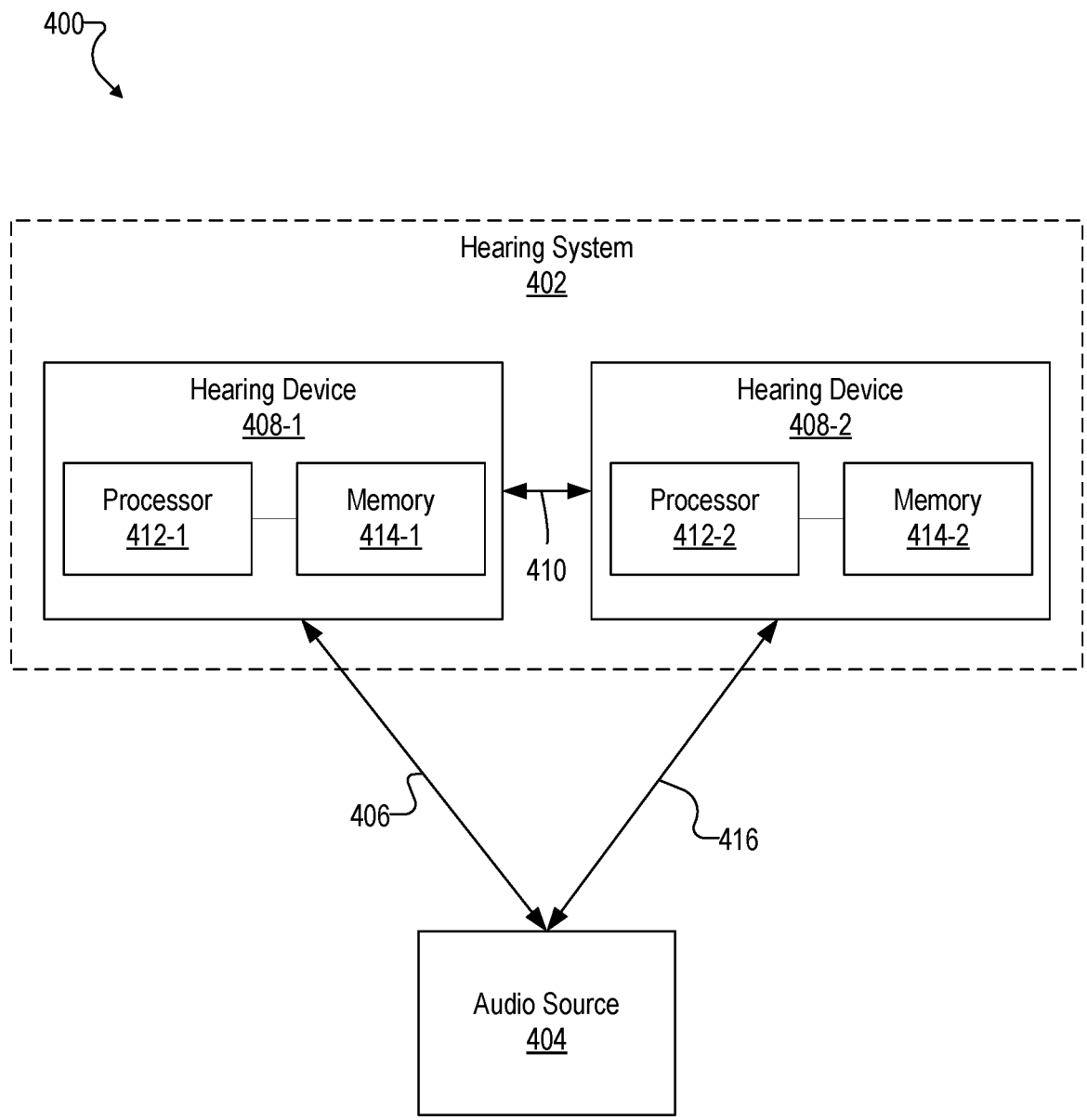
FIG. 4 illustrates an exemplary configuration in which a hearing system is configured to communicate with an audio source by way of a selectively established wireless link according to principles described herein.

FIG. 4 illustrates an exemplary configuration 400 in which a hearing system 402 (e.g., a binaural hearing system) is configured to communicate with an audio source 404 (e.g., an implementation of audio source 104) by way of a selectively established wireless link 406 and/or wireless link 416 (e.g., an implementation of wireless link 106). As shown, hearing system 402 includes a first hearing device 408-1 and a second hearing device 408-2 (collectively "hearing devices 408"). Hearing devices 408 may communicate one with another by way of a wireless support link 410.

Audio source 404 may include any computing device that outputs streaming audio (e.g., speech, music, or other audio content output) and that is capable of being wirelessly connected with at least one of hearing devices 408. For example, audio source 404 may be a mobile device (e.g., a mobile phone such as a smartphone, a tablet computer, a laptop computer, a mobile gaming device), a desktop computer, a television, a speaker, etc. As described herein, audio source 404 may wirelessly transmit streaming audio to hearing system 402 in the form of sequential audio packets (e.g., discrete units or pieces of data representative of the streaming audio).

Hearing devices 408 (e.g., implementations of hearing device 102) may each be implemented by any type of hearing device configured to provide or enhance hearing to a user of hearing system 402. For example, hearing devices 408 may each be implemented by a hearing aid configured to apply amplified audio content to a user, a sound processor included in a cochlear implant system configured to apply electrical stimulation representative of audio content to a user, a sound processor included in an electro-acoustic stimulation system configured to apply electro-acoustic stimulation to a user, a head-worn headset, an ear-worn ear-bud or any other suitable hearing prosthesis. In some examples, hearing device 408-1 is of a different type than hearing device 408-2. For example, hearing device 408-1 may be a hearing aid and hearing device 408-2 may be a sound processor included in a cochlear implant system.

As shown, each hearing device 408 includes a processor (e.g., an implementation of processor 108) and a memory (e.g. an implementation of memory 110). For example, hearing device 408-1 includes a processor 412-1 and a memory 414-1. Likewise, hearing device 408-2 includes a processor 412-2 and a memory 414-2.

Hearing devices 408 may communicate with each other (e.g., by transmitting data) by way of a wireless support link 410 that interconnects hearing devices 408. Wireless support link 410 may include any suitable wireless communication link as may serve a particular implementation.

As shown, hearing device 408-1 communicates with audio source 404 via wireless link 406 and hearing device 408-2 communicates with audio source 404 via wireless link 416. Additionally or alternatively, in some examples, hearing device 408-2 cannot or does not establish its own wireless link with audio source 404 while hearing device 408-1 is connected with audio source 404 by way of wireless link 406. For example, the communication protocol used by hearing devices 408 and audio source 404 to establish wireless links therebetween may not allow both hearing devices 408 to be concurrently connected to audio source 404.

In these examples, hearing device 408-2 may receive the audio packets transmitted from audio source 404 by eavesdropping on wireless link 406. In such examples, wireless link 416 may represent this eavesdropping topology. Hearing device 408-2 may eavesdrop on wireless link 406 by passively listening to (e.g., having access to) data traffic (e.g., audio packets) transmitted between audio source 404 and hearing device 408-1. The eavesdropping may be done without audio source 404 being aware that hearing device 408-2 is accessing the data traffic and without hearing device 408-2 transmitting any data to audio source 404.

To enable eavesdropping by hearing device 408-2 on wireless link 406, hearing device 408-1 may transmit, over wireless support link 410, eavesdropping instructions to hearing device 408-2. The eavesdropping instructions may include information (e.g., frequency hopping sequence information, clock frequency and phase offset information, encryption key information, address information, etc.) that allows hearing device 408-2 to detect audio packets that are wirelessly transmitted from audio source 404 to hearing device 408-1. Hearing device 408-2 may accordingly use the eavesdropping instructions to eavesdrop on wireless link 406.

Figure 5:
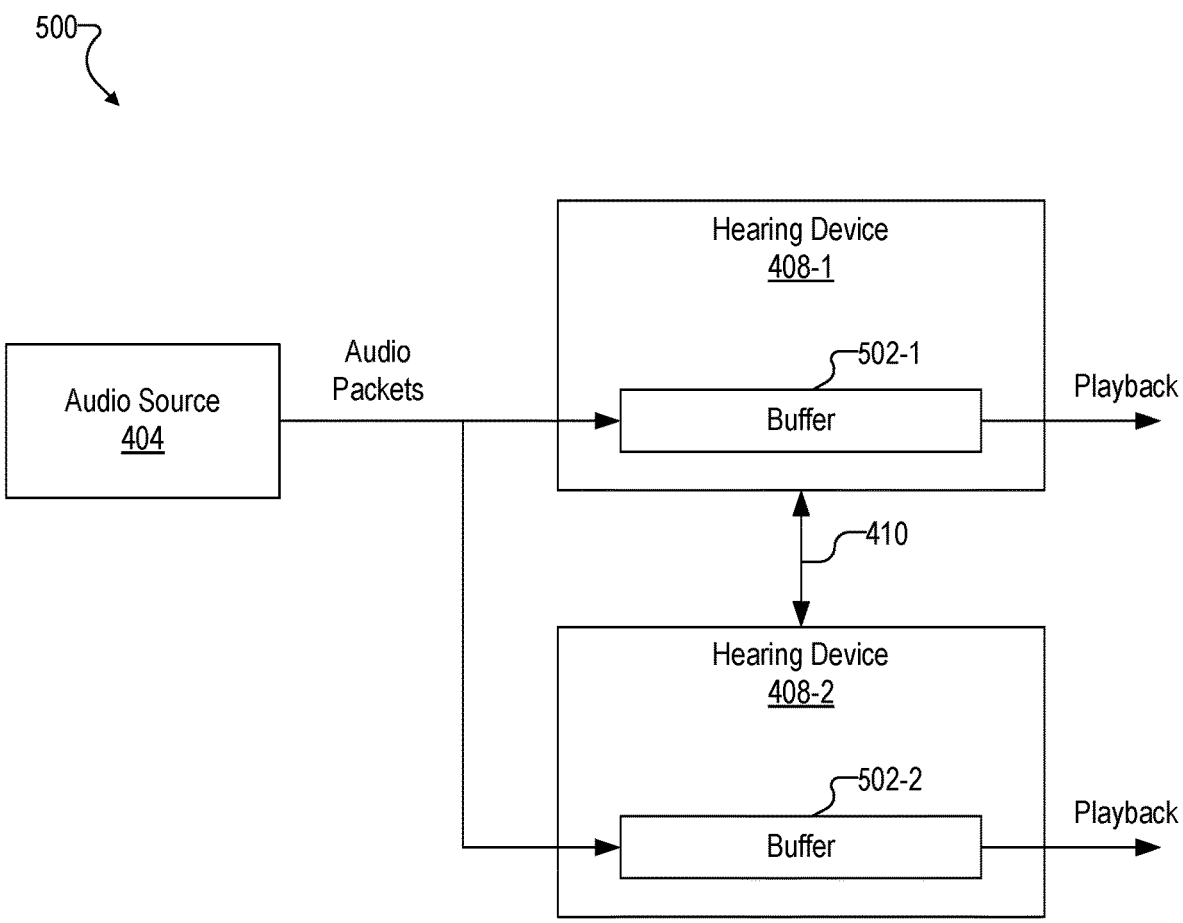
FIG. 5 illustrates an exemplary configuration in which hearing devices included in a hearing system both receive audio packets from the audio source into buffers according to principles described herein.

FIG. 5 illustrates an exemplary configuration 500 in which hearing devices 408 both render streaming audio from audio source 404. As shown, audio source 404 transmits sequential audio packets, which are received by both hearing device 408-1 and hearing device 408-2. As described in connection with FIG. 4, hearing device 408-1 may receive the audio packets over wireless link 106 and hearing device 408-2 may receive the audio packets by eavesdropping on wireless link 406.

As shown, hearing device 408-1 stores the audio packets in a buffer 502-1. Likewise, hearing device 408-2 stores the audio packets in a buffer 502-2. Buffer 502-1 and buffer 502-2 (collectively "buffers 502") may be maintained within memory 414-1 and memory 414-2, respectively, and may each be of any suitable size (e.g., buffers 502 may each store any suitable number of audio packets).

Hearing devices 408 may render streaming audio from audio source 404 by playing back audio packets stored within buffers 502. For example, hearing device 408-1 may render streaming audio from audio source 404 by playing back audio packets stored within buffer 502-1. Likewise, hearing device 408-2 may render streaming audio from audio source 404 by playing back audio packets stored within buffer 502-2. In so doing, the audio packets that are played back may be removed from buffers 502. Hearing devices 408 may use any suitable processing technique to play back audio packets stored within buffers 502.

Playback of audio packets in buffers 502 may occur while additional audio packets are being received and stored within buffers 502. In this manner, buffers 502 may allow continuous rendering of streaming audio from audio source 404 as the audio is generated and transmitted by audio source 404.

An audio packet may be stored in a buffer (e.g., one of buffers 502) in any suitable manner. For example, a decoded, transcoded, and/or decompressed version of an audio packet (instead of the audio packet itself) may be stored in a buffer.

Figure 6:
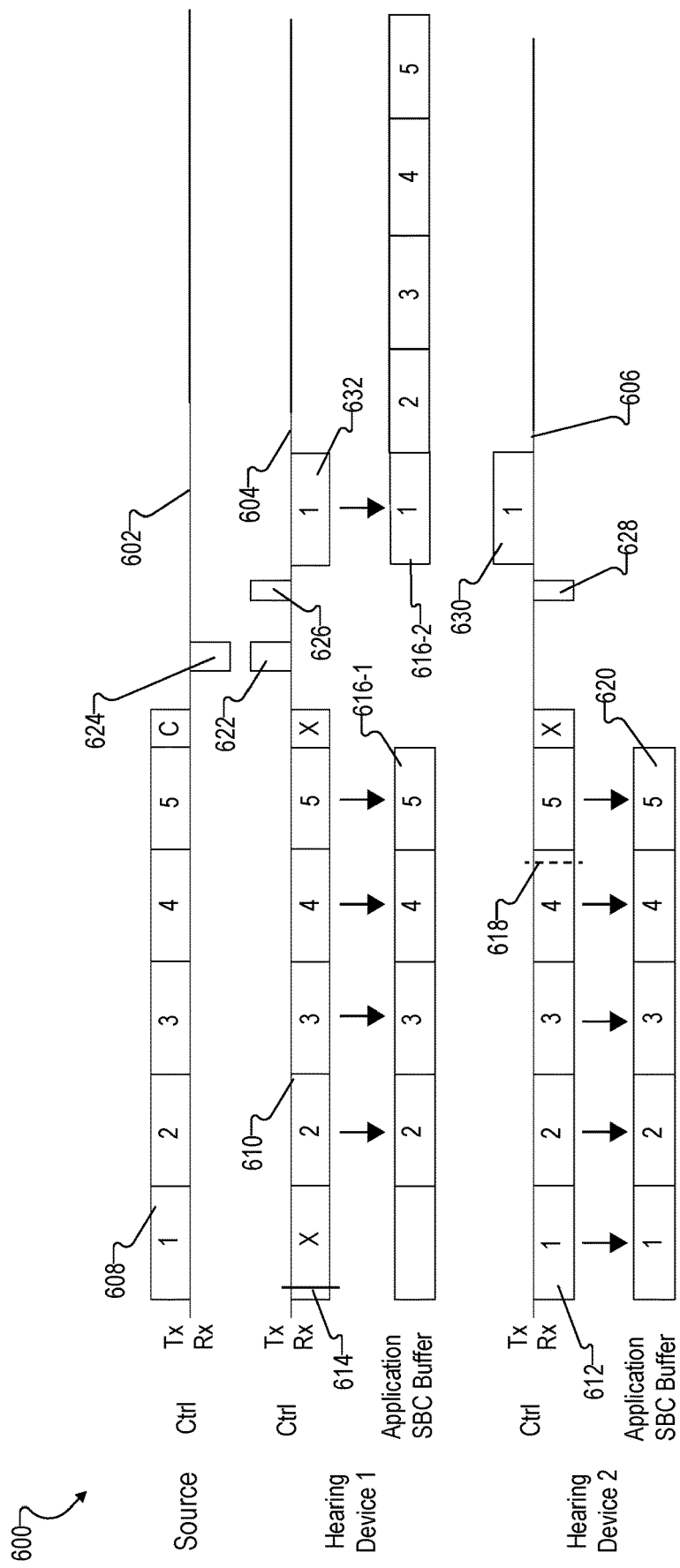
FIGS. 6-7 illustrate exemplary diagrams of selectively storing data included in a corrupted data packet according to principles described herein.

FIG. 6 illustrates an exemplary diagram 600 for selectively storing data included in a corrupted data packet. Diagram 600 includes a line 602 showing data transmitted and received by an audio source (e.g., audio source 104). A line 604 shows data transmitted and received by a hearing device (e.g., hearing device 108-1). A line 606 shows data transmitted and received by an additional hearing device (e.g., hearing device 108-2). Line 602 shows a block 608 indicating an audio packet transmitted by audio source 104. Line 604 shows a block 610 indicating hearing device 108-1 receiving the audio packet. Line 606 shows a block 612 indicating hearing device 108-2 also receiving the audio packet.

Block 610 shows the audio packet received by hearing device 108-1 includes corrupted data in frame 1, as shown by line 614. As a result, hearing device 108-1 may determine that the received audio packet has an invalid checksum. In response, hearing device 108-1 may access checksums of frames of the received audio packet and determine a checksum of frame 1 is invalid, while checksums of frames 2-5 are valid. Consequently, hearing device 108-1 may store frames 2-5 and discard frame 1, as shown by a block 616-1 representing a state of a buffer of hearing device 108-1.

Meanwhile, block 612 shows the audio packet received by hearing device 108-2 includes corrupted data in audio samples of frame 4, as shown by a dashed line 618. As described, hearing device 108-2 may determine that the received audio packet has an invalid checksum, but that checksums of frames 1-5 are valid. Thus, hearing device 108-2 may store frames 1-5, as shown by a block 620 representing a state of a buffer of hearing device 108-2.

Hearing device 108-1 may transmit an acknowledgment message to audio source 104, as shown by a block 622. Audio source 104 may receive the acknowledgment message as shown by a block 624. Alternatively, in some examples, hearing device 108-1 may refrain from transmitting an acknowledgment message.

Hearing device 108-1 may transmit to hearing device 108-2 a message (e.g., shown by a block 626) indicating that hearing device 108-1 is missing frame 1 of the audio packet transmitted by audio source 104. Hearing device 108-2 may receive the message (e.g., shown by a block 628). In response, hearing device 108-2 may forward (e.g., transmit) frame 1 to hearing device 108-1, as shown by a block 630. Hearing device 108-1 may receive frame 1 from hearing device 108-2, as shown by a block 632, and store the received frame 1 in the buffer of hearing device 108-1, as shown by a block 616-2. In this manner, hearing device 108-1 may be able to store a playable instance of the transmitted audio packet.

As hearing device 108-1 may receive missing frames (e.g., frame 1) of the audio packet from hearing device 108-2 rather than the entire audio packet from hearing device 108-2 or as a retransmission from audio source 104, resources such as time and bandwidth may be conserved. Such conservation of resources may allow audio source 104 to quickly transmit a subsequent audio packet. In this manner, buffer underflows, delays in playback, and/or audio interruptions may be minimized.

Figure 7:
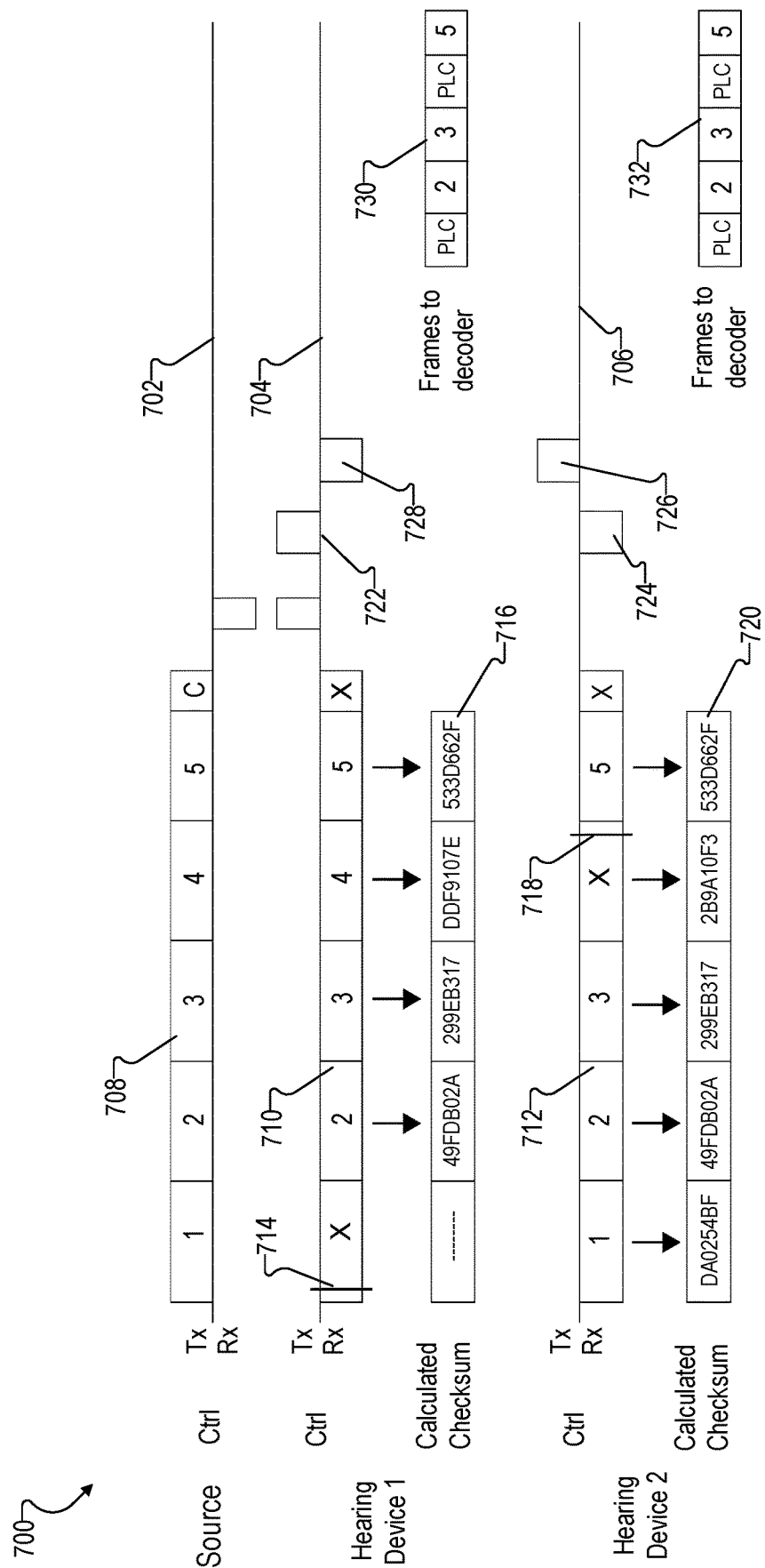

FIG. 7 illustrates another example diagram 700 for selectively storing data included in a corrupted data packet. Diagram 700 includes a line 702 showing data transmitted and received by an audio source (e.g., audio source 104). A line 704 shows data transmitted and received by a hearing device (e.g., hearing device 108-1). A line 706 shows data transmitted and received by an additional hearing device (e.g., hearing device 108-2). Line 702 shows a block 708 indicating an audio packet transmitted by audio source 104. Line 704 shows a block 710 indicating hearing device 108-1 receiving the audio packet. Line 706 shows a block 712 indicating hearing device 108-2 also receiving the audio packet.

Block 710 shows the audio packet received by hearing device 108-1 includes corrupted data in frame 1, as shown by a line 714. As a result, hearing device 108-1 may determine that the received audio packet has an invalid checksum. In response, hearing device 108-1 may access checksums of frames of the received audio packet. In this example, the audio packet may not include checksums for frames of the audio packet. Hearing device 108-1 may thus access checksums by calculating checksums of each frame of the audio packet, as shown by a block 716. The corrupted data in frame 1 of this example results in hearing device 108-1 unable to calculate a checksum for frame 1. Such an error may be considered an invalid checksum and hearing device 108-1 may discard frame 1. The other checksums may be stored by hearing device 108-1.

Meanwhile, block 712 shows the audio packet received by hearing device 108-2 includes corrupted data in frame 4, as shown by a line 718. As a result, hearing device 108-2 may also determine that the received audio packet has an invalid checksum. In response, hearing device 108-2 may also access checksums of frames of the received audio packet by calculating checksums for each frame of the audio packet. Hearing device 108-2 may store the calculated checksums.

Hearing device 108-1 and hearing device 108-2 may then transmit to each other the checksums calculated by each hearing device. As shown, a block 722 may indicate hearing device 108-1 transmitting calculated checksums to hearing device 108-2. A block 724 indicates hearing device 108-2 receives the checksums calculated by hearing device 108-1. Likewise, hearing device 108-2 transmits to hearing device 108-1 checksums calculated by hearing device 108-2, as shown by a block 726. Hearing device 108-1 receives the checksums calculated by hearing device 108-2, as shown by a block 728.

Hearing devices 108 may then compare the checksums calculated for each frame. If the checksums calculated for a frame by each of hearing devices 108 match, hearing devices 108 may consider the frame has been transmitted correctly. In response, hearing devices 108 may store the frame for playback. If the checksums calculated for a frame by each of hearing devices 108 differ, hearing devices 108 may consider at least one of hearing devices 108 has received corrupted data for the frame. In response, hearing devices 108 may discard the frame. Additionally or alternatively, hearing devices 108 may set an invalid flag for the frame, such as a flag to engage a packet loss concealment (PLC) mechanism.

As shown for this example, checksums calculated by hearing devices 108 differ for frame 1 (since hearing device 108-1 could not calculate a checksum) and frame 4 (since hearing device 108-2 received corrupted data). Checksums calculated by hearing devices 108 match for frames 2, 3, and 5. Thus, hearing devices 108 may store frames 2, 3, and 5 while engaging a PLC mechanism for frames 1 and 4. A block 730 and a block 732 may represent a state of a buffer for hearing device 108-1 and a state of a buffer for hearing device 108-2, respectively. Blocks 730 and 732 show the stored frames 2, 3, and 5 and a flag set for engaging the PLC mechanism for frames 1 and 4. Additionally or alternatively, hearing device 108-1 and/or hearing device 108-2 may request a retransmission of the audio packet to attempt to store frames 1 and 4.

In this manner, systems and methods described herein may be used for any suitable type of audio data, media data, and/or any suitable data packets that includes a plurality of frames for each packet of data received from any suitable data source. Further, while an eavesdropping topology has been described for hearing devices 108, hearing devices 108 may be communicatively connected to each other and/or audio source 104 using any suitable communication link for transmitting and receiving packets of data. Additionally, while hearing devices 108 have been described to include two hearing devices, any suitable number of hearing devices and/or other media playback devices, computing devices, etc. may be used.

Figure 8:
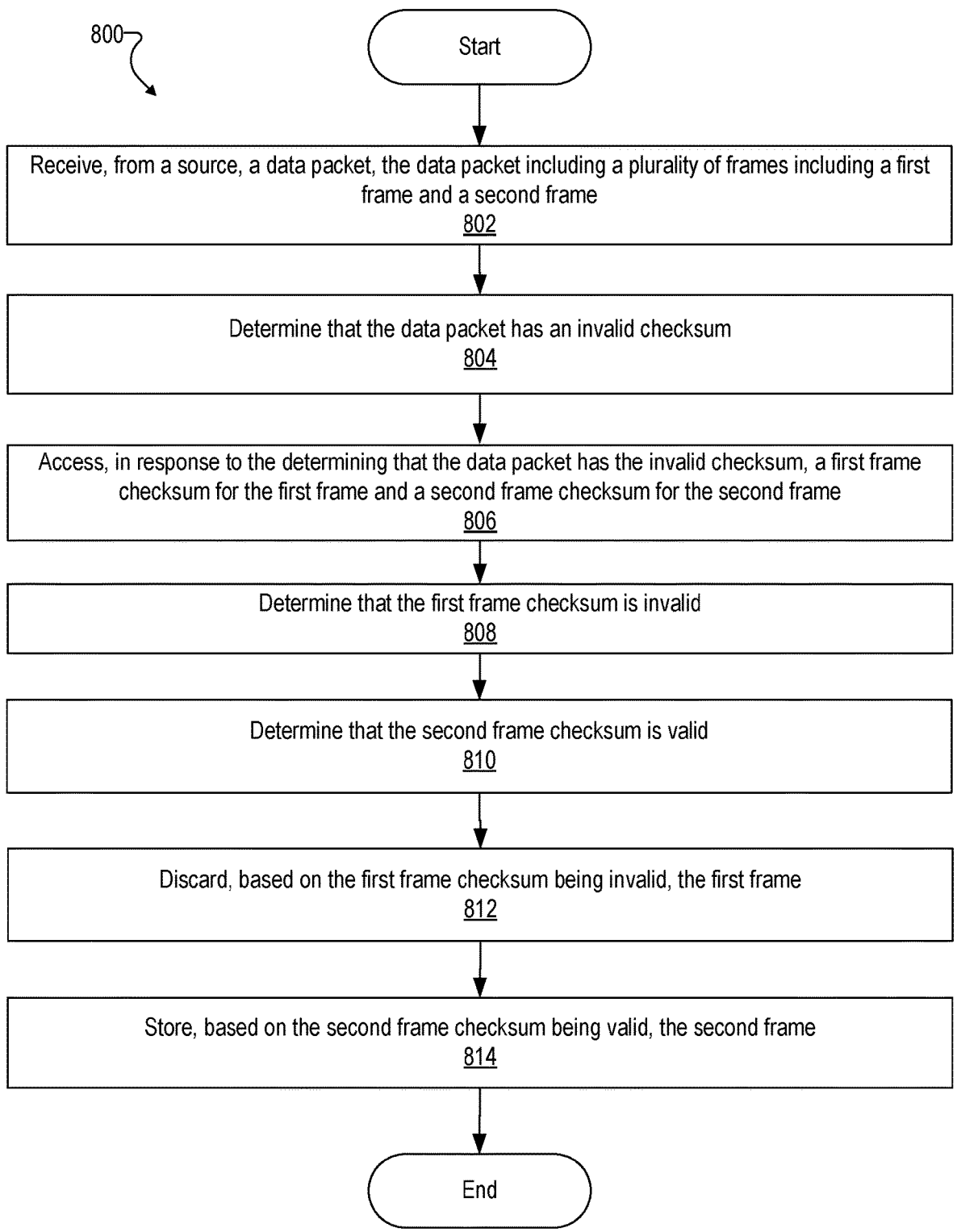
FIG. 8 illustrates an exemplary method for selectively storing data included in a corrupted data packet according to principles described herein.

FIG. 8 illustrates an exemplary method 800. One or more of the operations shown in FIG. 8 may be performed by any of the hearing devices described herein. While FIG. 8 illustrates exemplary operations according to one embodiment, other embodiments may omit, add to, reorder, and/or modify any of the operations shown in FIG. 8.

In step 802, a processor of a hearing device receives, from a source, a data packet, the data packet including a plurality of frames including a first frame and a second frame. Step 802 may be performed in any of the ways described herein.

In step 804, the processor determines that the data packet has an invalid checksum. Step 804 may be performed in any of the ways described herein.

In step 806, the processor accesses, in response to the determining that the data packet has the invalid checksum, a first frame checksum for the first frame and a second frame checksum for the second frame. Step 806 may be performed in any of the ways described herein.

In step 808, the processor determines that the first frame checksum is invalid. Step 808 may be performed in any of the ways described herein.

In step 810, the processor determines that the second frame checksum is valid. Step 810 may be performed in any of the ways described herein.

In step 812, the processor discards, based on the first frame checksum being invalid, the first frame. Step 812 may be performed in any of the ways described herein.

In step 814, the processor stores, based on the second frame checksum being valid, the second frame. Step 814 may be performed in any of the ways described herein.

Figure 9:
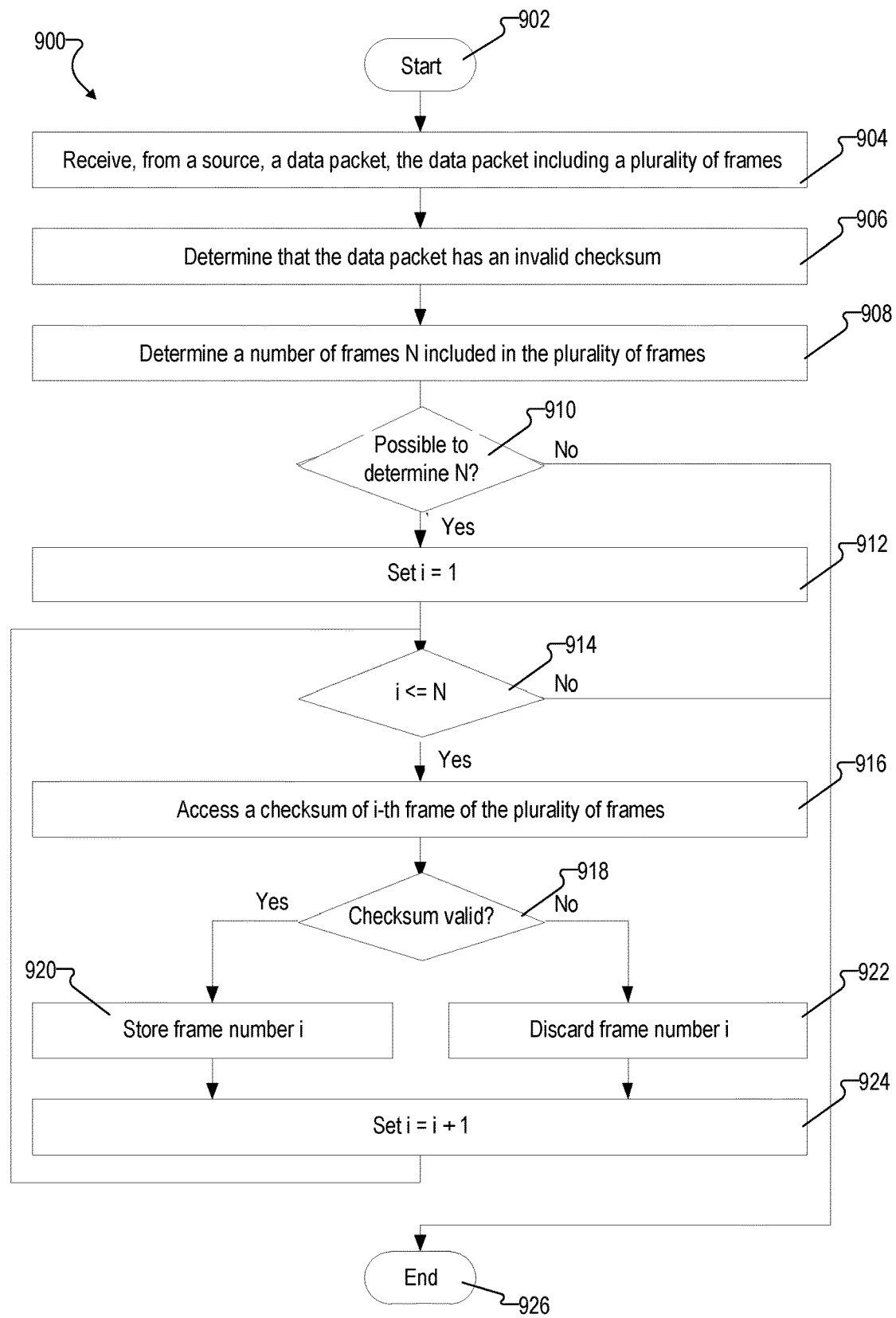
FIG. 9 illustrates an exemplary method.

FIG. 9 illustrates an exemplary method 900. One or more of the operations shown in FIG. 9 may be performed by any of the hearing devices described herein. While FIG. 9 illustrates exemplary operations according to one embodiment, other embodiments may omit, add to, reorder, and/or modify any of the operations shown in FIG. 9.

In step 902, the method starts.

In step 904, a processor of a hearing device receives, from a source, a data packet, the data packet including a plurality of frames. Step 904 may be performed in any of the ways described herein.

In step 906, the processor determines that the data packet has an invalid checksum. Step 906 may be performed in any of the ways described herein.

In step 908, the processor determines a number of frames, N, included in the plurality of frames. Step 908 may be performed in any suitable manner. For example, the processor may determine the number of frames from a header of the data packet, from predetermined information based on a protocol of the data packet and/or a protocol used by the hearing device and/or the source, from a size of the data packet and/or a size of the frames, etc.

In step 910, the processor proceeds based on whether the number N is able to be determined. Step 910 may be performed in any suitable manner. For instance, if the processor determined N in step 908, then the processor may determine that N was able to be determined. However, in some examples, N may be indeterminable, for instance, due to a corrupt header and/or lack of information. If the processor is unable to determine N, the processor may proceed to step 926, where the method ends. If the processor is able to determine N, the processor may proceed to step 912.

In step 912, the processor sets a counter variable, i, to 1. Step 912 may be performed in any suitable manner.

In step 914, the processor determines whether the counter variable, i, is less than or equal to the number of frames, N. Step 914 may be performed in any suitable manner. If the counter variable i is not less than or equal to the number of frames N (i.e. i>N), the processor may proceed to step 926, where the method ends. If the counter variable i is less than or equal to the number of frames N, the processor may proceed to step 916

In step 916, the processor accesses a checksum of an $i^{th}$ frame of the plurality of frames. Step 916 may be performed in any of the ways described herein.

In step 918, the processor determines whether the checksum of the $i^{th}$ frame is valid. Step 918 may be performed in any of the ways described herein. If the checksum of the $i^{th}$ frame is valid, the processor may proceed to step 920. If the checksum of the $i^{th}$ frame is not valid, the processor may proceed to step 922.

In step 920, the processor stores the $i^{th}$ frame, based on the checksum of the $i^{th}$ frame being valid. Step 920 may be performed in any of the ways described herein.

In step 922, the processor discards the $i^{th}$ frame, based on the checksum of the $i^{th}$ frame being invalid. Step 922 may be performed in any of the ways described herein.

In step 924, the processor sets the counter variable i to i+1 (e.g., increments the counter variable i). Step 924 may be performed in any suitable manner. The processor may proceed to step 914.

In step 926, the method ends.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device comprising:
    a memory storing instructions; and
    a processor communicatively coupled to the memory and configured to execute the instructions to:
        receive, from a source, a data packet, the data packet including a plurality of frames including a first frame and a second frame;
        determine that the data packet has an invalid checksum;
        access, in response to the determining that the data packet has the invalid checksum, a first frame checksum for the first frame and a second frame checksum for the second frame;
        determine that the first frame checksum is invalid;
        determine that the second frame checksum is valid;
        discard, based on the first frame checksum being invalid, the first frame; and
        store, based on the second frame checksum being valid, the second frame.

2. The hearing device of claim 1, wherein:
    the data packet is an audio packet; and
    the processor is further configured to execute the instructions to render audio represented by the audio packet.

3. The hearing device of claim 2, wherein:
    the audio packet is an advanced audio distribution profile (A2DP) compatible audio packet; and the determining that the audio packet has an invalid checksum includes determining that the audio packet has an invalid packet-level cyclic redundancy check (CRC).

4. The hearing device of claim 1, wherein:
the first frame and the second frame are encoded using sub-band coding (SBC);
the accessing the first frame checksum includes accessing a frame-level CRC of the first frame; and
the accessing the second frame checksum includes accessing a frame-level CRC of the second frame.

5. The hearing device of claim 1, wherein the processor is further configured to execute the instructions to:
receive, from the source, an additional data packet, the additional data packet being a retransmission of the data packet;
determine that the additional data packet has an invalid checksum;
access an additional first frame checksum of a first frame of the additional data packet;
determine that the additional first frame checksum is valid;
store, based on the additional first frame checksum, the additional first frame with the stored second frame.

6. The hearing device of claim 1, wherein the processor is further configured to execute the instructions to receive, from an additional hearing device also configured to receive the data packet, a first frame of the data packet received by the additional hearing device.

7. The hearing device of claim 6, wherein:
the hearing device is configured to receive the data packet via a Bluetooth connection; and
the additional hearing device is configured to also receive the data packet via a Bluetooth eavesdropping topology.

8. The hearing device of claim 1, wherein:
the accessing the first frame checksum includes calculating a checksum for the first frame; and
the accessing the second frame checksum includes calculating a checksum for the second frame.

9. The hearing device of claim 8, wherein:
the processor is further configured to execute the instructions to:
receive, from the source, an additional data packet, the additional data packet being a retransmission of the data packet,
determine that the additional data packet has an invalid checksum,
calculate an additional first frame checksum for a first frame of the additional data packet, and
calculate an additional second frame checksum for a second frame of the additional data packet;
the determining that the first frame checksum is invalid includes determining that the first frame checksum is different from the additional first frame checksum; and
the determining that the second frame checksum is valid includes determining that the second frame checksum is equal to the additional second frame checksum.

10. The hearing device of claim 8, wherein:
the processor is further configured to execute the instructions to:
receive, from an additional hearing device also configured to receive the data packet, an additional first frame checksum corresponding to a checksum calculated by the additional hearing device based on a first frame of the data packet received by the additional hearing device, and
receive, from the additional hearing device, an additional second frame checksum corresponding to a checksum calculated by the additional hearing device based on a second frame of the data packet received by the additional hearing device;
the determining that the first frame checksum is invalid includes determining that the first frame checksum is different from the additional first frame checksum; and
the determining that the second frame checksum is valid includes determining that the second frame checksum is equal to the additional second frame checksum.

11. The hearing device of claim 10, wherein the processor is further configured to execute the instructions to transmit the first frame checksum and the second frame checksum to the additional hearing device.

12. The hearing device of claim 1, wherein the data packet is received from the source via a Bluetooth connection.

13. The hearing device of claim 1, wherein the data packet is received from the source via a Bluetooth eavesdropping topology.

14. The hearing device of claim 1, wherein:
the accessing the first frame checksum includes accessing a checksum based on a portion of the first frame; and
the accessing the second frame checksum includes accessing a checksum based on a portion of the second frame.

15. The hearing device of claim 1, wherein the processor is further configured to execute the instructions to transmit, to the source, an acknowledgment message indicating a receiving of the data packet based on a receiving the plurality of frames with corresponding valid frame checksums.

16. A system comprising:
a first hearing device and a second hearing device,
the first hearing device configured to:
receive, from a source, a data packet, the data packet including a plurality of frames including a first frame and a second frame;
determine that the data packet has an invalid checksum;
access, in response to the determining that the data packet has the invalid checksum, a first frame checksum for the first frame and a second frame checksum for the second frame;
determine that the first frame checksum is invalid;
determine that the second frame checksum is valid;
discard, based on the first frame checksum being invalid, the first frame; and
store, based on the second frame checksum being valid, the second frame.

17. The system of claim 16, wherein:
the data packet is an audio packet; and
the first hearing device is further configured to render audio represented by the audio packet.

18. The system of claim 17, wherein:
the audio packet is an advanced audio distribution profile (A2DP) compatible audio packet; and
the determining that the audio packet has an invalid checksum includes determining that the audio packet has an invalid packet-level cyclic redundancy check (CRC).

19. The system of claim 16, wherein:
the first frame and the second frame are encoded using sub-band coding (SBC);
the accessing the first frame checksum includes accessing a frame-level CRC of the first frame; and
the accessing the second frame checksum includes accessing a frame-level CRC of the second frame.

20. A method comprising:
receiving, by a processor and from a source, a data packet, the data packet including a plurality of frames including a first frame and a second frame;
determining, by the processor, that the data packet has an invalid checksum;
accessing, by the processor, in response to the determining that the data packet has the invalid checksum, a first frame checksum for the first frame and a second frame checksum for the second frame;
determining, by the processor, that the first frame checksum is invalid;
determining, by the processor, that the second frame checksum is valid;
discarding, by the processor and based on the first frame checksum being invalid, the first frame; and
storing, by the processor and based on the second frame checksum being valid, the second frame.

* * * * *